(12) United States Patent
Gyoda

(10) Patent No.: US 11,073,741 B2
(45) Date of Patent: Jul. 27, 2021

(54) ZOOM LENS AND OPTICAL APPARATUS

(71) Applicant: CANON KABUSHIKI KAISHA, Tokyo (JP)

(72) Inventor: Yuichi Gyoda, Utsunomiya (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 17 days.

(21) Appl. No.: 16/776,989

(22) Filed: Jan. 30, 2020

(65) Prior Publication Data
US 2020/0257181 A1    Aug. 13, 2020

(30) Foreign Application Priority Data

Feb. 8, 2019    (JP) .............................. JP2019-021356

(51) Int. Cl.
*G03B 7/20* (2021.01)
*G02B 15/14* (2006.01)

(52) U.S. Cl.
CPC ....... *G03B 7/20* (2013.01); *G02B 15/145523* (2019.08); *G03B 2205/0046* (2013.01)

(58) Field of Classification Search
CPC .............. G03B 7/20; G03B 2205/0046; G02B 15/145523
See application file for complete search history.

(56) References Cited

U.S. PATENT DOCUMENTS

| | | | |
|---|---|---|---|
| 9,268,119 B2 * | 2/2016 | Sugita | G02B 15/144507 |
| 9,406,510 B2 | 8/2016 | Tsujita et al. | |
| 9,897,788 B2 | 2/2018 | Gyoda | |
| 10,025,075 B2 | 7/2018 | Gyoda | |
| 10,120,172 B2 | 11/2018 | Gyoda | |
| 10,215,972 B2 | 2/2019 | Gyoda et al. | |
| 2005/0270661 A1 * | 12/2005 | Nanba | G02B 15/144113 359/676 |
| 2019/0094490 A1 | 3/2019 | Gyoda | |
| 2020/0110251 A1 | 4/2020 | Gyoda | |

FOREIGN PATENT DOCUMENTS

JP    2018013685 A    1/2018

* cited by examiner

*Primary Examiner* — Christopher E Mahoney
(74) *Attorney, Agent, or Firm* — Carter, DeLuca & Farrell LLP

(57) ABSTRACT

A zoom lens includes a plurality of lens units, in which a distance between adjacent lens units changes during zooming, a first aperture stop, and a second aperture stop disposed on an image side of the first aperture stop. An aperture diameter of the first aperture stop determines an F-number of the zoom lens at a wide-angle end. The plurality of lens units includes a negative lens unit having a negative refractive power that is disposed on the image side of the first aperture stop and on an object side of the second aperture. An aperture diameter of the second aperture stop changes during the zooming. The aperture diameter of the second aperture stop at the wide-angle end is larger than the aperture diameter of the second aperture stop at a telephoto end.

15 Claims, 8 Drawing Sheets

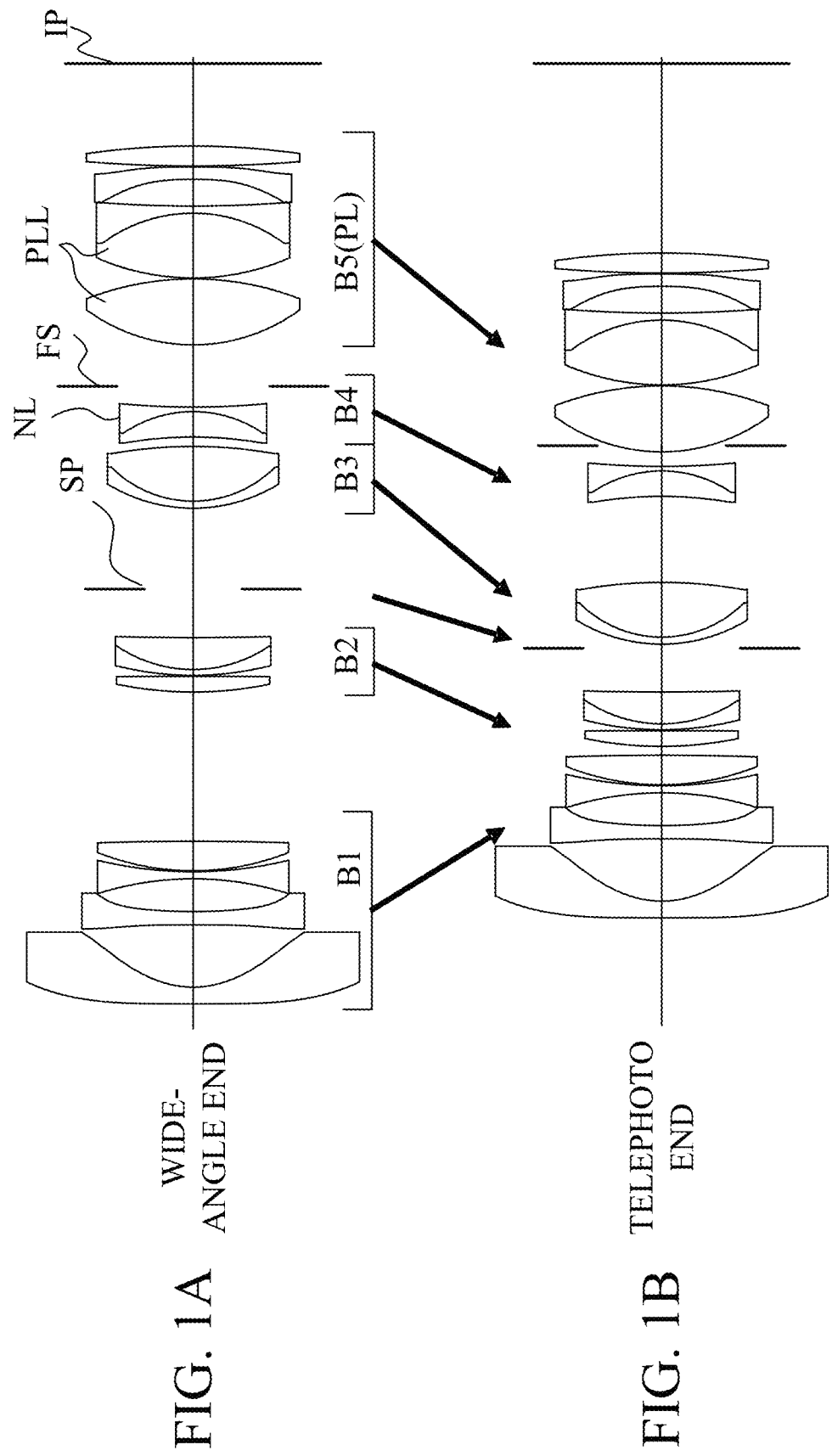

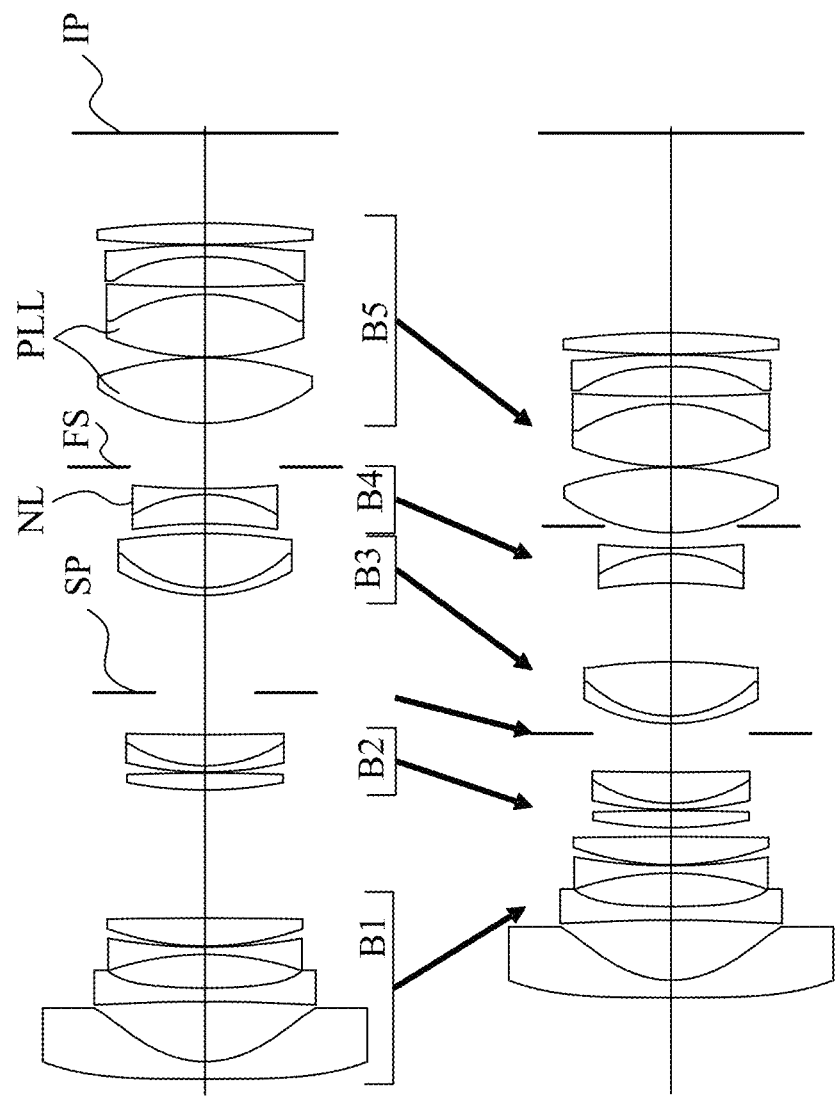

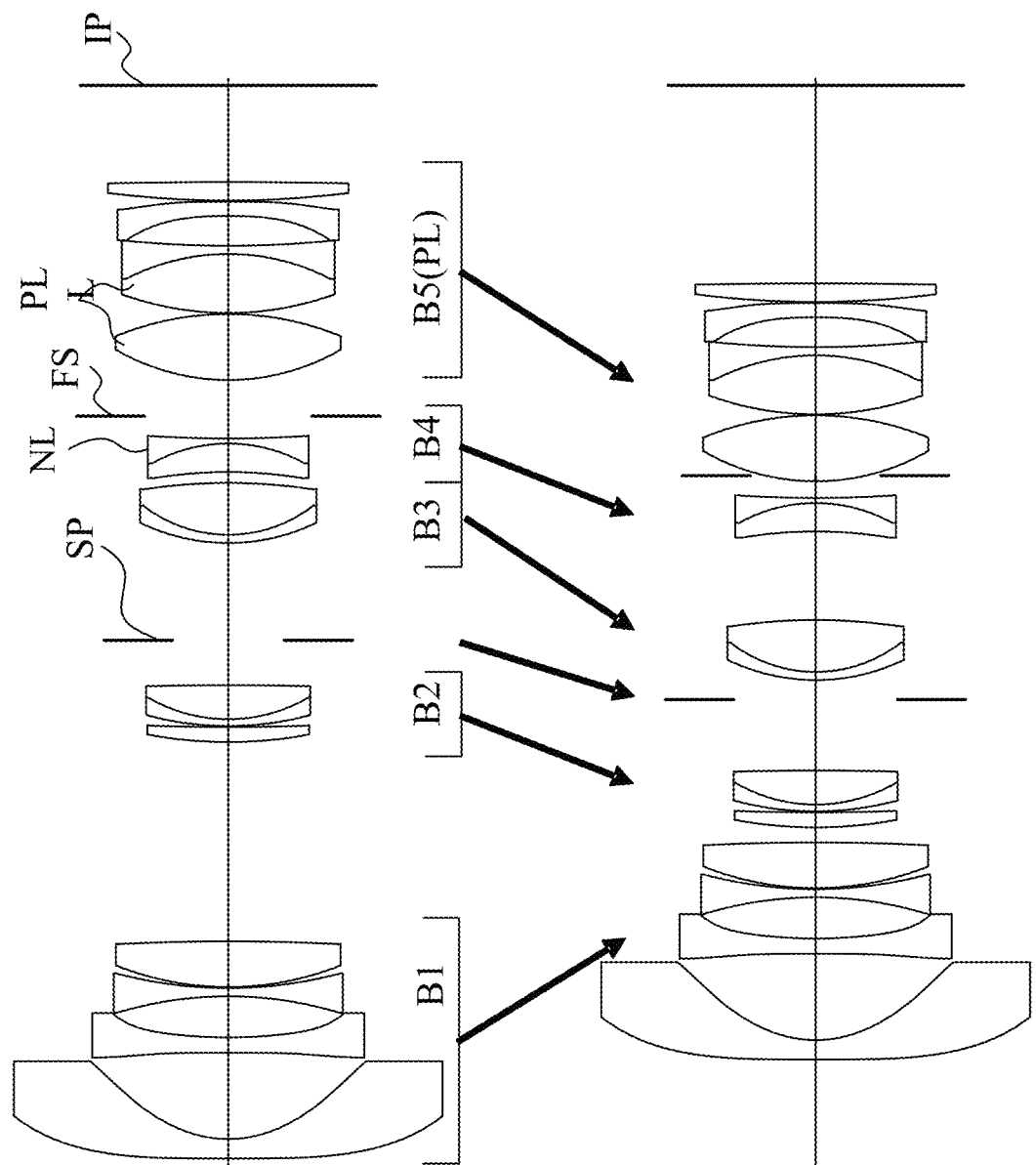

ZOOM LENS AND OPTICAL APPARATUS

BACKGROUND OF THE INVENTION

Field of the Invention

The present invention relates to a zoom lens used as an imaging optical system in an optical apparatus such as a digital camera, a lens apparatus, and a surveillance camera.

Description of the Related Art

The zoom lens has been demanded to have a high optical performance over the entire zoom range. Among such imaging optical systems, as a wide-angle zoom lens having a half angle of view of about 40° or more at the wide-angle end, Japanese Patent Laid-Open No. 2018-013685 discloses a zoom lens that includes, in order from the object side, five of negative, positive, negative, positive and positive lens units.

In order for the wide-angle zoom lens to provide the high optical performance without increasing its size, optical elements such as each lens unit, an aperture stop (Fno stop), and a flare cutting stop may be properly disposed.

SUMMARY OF THE INVENTION

The present invention provides a compact zoom lens having an Fno stop and a flare cutting stop, and having a high optical performance over an entire zoom range.

A zoom lens according to one aspect of the present invention includes a plurality of lens units, in which a distance between adjacent lens units changes during zooming, a first aperture stop, and a second aperture stop disposed on an image side of the first aperture stop. An aperture diameter of the first aperture stop determines an F-number of the zoom lens at a wide-angle end. The plurality of lens units includes a negative lens unit having a negative refractive power that is disposed on the image side of the first aperture stop and on an object side of the second aperture. An aperture diameter of the second aperture stop changes during the zooming. The aperture diameter of the second aperture stop at the wide-angle end is larger than the aperture diameter of the second aperture stop at a telephoto end.

An optical apparatus including the above zoom lens also constitutes another aspect of the present invention.

Further features of the present invention will become apparent from the following description of exemplary embodiments with reference to the attached drawings.

BRIEF DESCRIPTION OF THE DRAWINGS

FIGS. 1A and 1B are sectional views of a zoom lens according to Example 1.

FIGS. 3A and 3B are sectional views of a zoom lens according to Example 2.

FIGS. 5A and 5B are sectional views of a zoom lens according to Example 3.

DESCRIPTION OF THE EMBODIMENTS

Figure 2A:
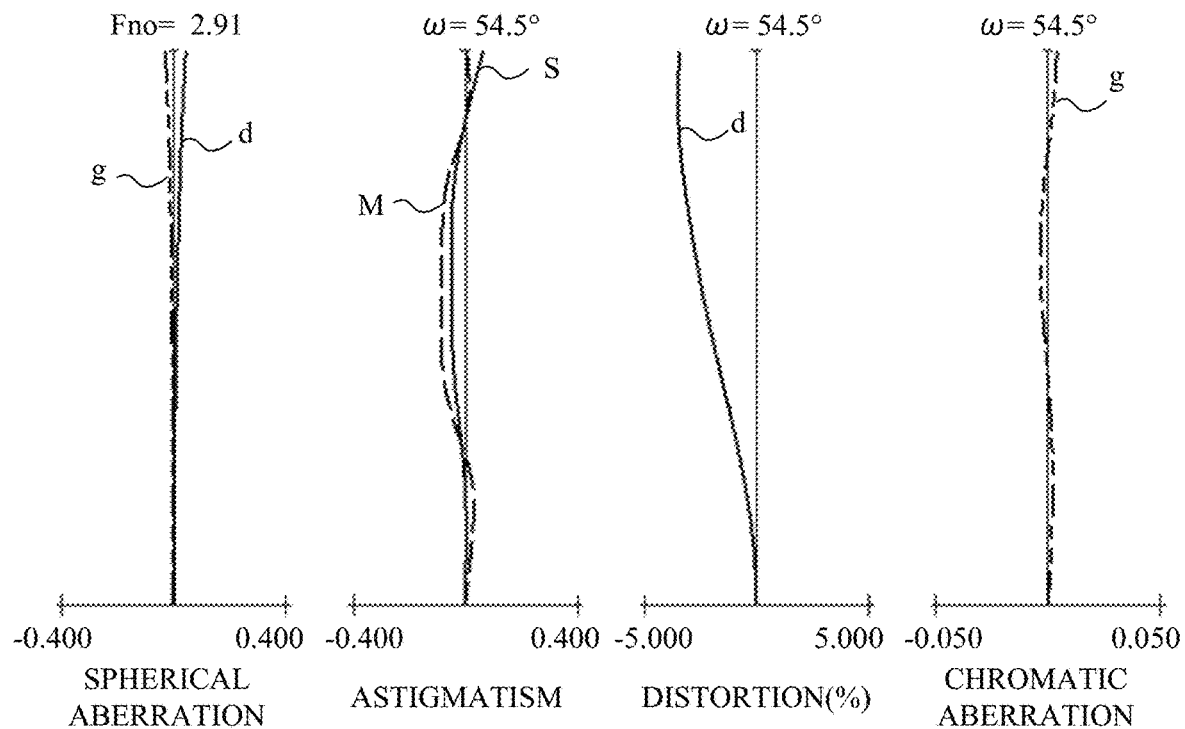
FIGS. 2A and 2B are aberration diagrams of the zoom lens according to Example 1.

Referring now to the accompanying drawings, a description will be given of embodiments according to the present invention. Prior to a specific description for Examples 1 to 3, items common to each example will be described.

A zoom lens according to each example is an imaging optical system used in various optical apparatus such as an imaging apparatus including a digital camera, a silver-halide film camera, a video camera, a television camera, and a surveillance camera, and a lens apparatus such as an interchangeable lens. The zoom lens according to each example may be used as a projection optical system for an image projecting apparatus (projector).

In the sectional views of the zoom lens provided in FIGS. 1A, 1B, 3A, 3B, 5A and 5B, the left side is an object side (also referred to as a front side), and the right side is an image side or an image plane side (also referred to as a rear side). The zoom lens includes a plurality of lens units, and performs a magnification variation (zooming) by changing a distance between adjacent lens units in the optical axis direction. Each lens unit includes one or more lenses.

i is the order of a lens unit from an object side to an image side, and Bi is an i-th lens unit. The Fno stop SP as a first aperture stop (diaphragm) determines (restricts) a light beam of the open F-number (Fno). A flare cutting stop FS as a second aperture stop changes its aperture diameter during zooming and cuts off unnecessary light that causes flares or the like, so as to prevent the unnecessary light from reaching an image plane IP.

At the position of the image plane IP of the zoom lens according to each example used in the imaging apparatus, an image sensor that includes a photoelectric converter, such as a CCD sensor and a CMOS sensor, or a silver-halide film is disposed.

The zoom lens is settable to any zooming state within the entire zoom range from the wide-angle end to the telephoto end. The wide-angle end and the telephoto end are zooming states where each lens unit is positioned at both ends of the range in which each lens unit is mechanically movable in the optical axis direction. In FIGS. 1A, 1B, 3A, 3B, 5A and 5B, solid arrows indicate movement trajectories of the lens units during zooming from the wide-angle end to the telephoto end.

In each of spherical aberration diagrams in FIGS. 2A, 2B, 4A, 4B, 6A and 6B, Fno is the F-number, a solid line represents a spherical aberration for the d-line (with a wavelength 587.6 nm), and an alternate long and two short dashes line represents the spherical aberration for the g-line (with a wavelength 435.8 nm). In each of astigmatism diagrams, a solid line S represents a sagittal image plane, and a broken line M represents a meridional image plane. Each of distortion aberration diagrams describes a distortion for the d-line. Each of chromatic aberration diagrams represents a lateral chromatic aberration for the g-line, and ω is a half angle of view (°).

A description will now be given of optical configurations of the zoom lens according to Examples 1 to 3 illustrated in FIGS. 1A, 1B, 3A, 3B, 5A and 5B. FIGS. 1A, 3A and 5A are sectional views of the zoom lenses at the wide-angle end, and FIGS. 1B, 3B and 5B are sectional views of the zoom lenses at the telephoto end. The zoom lens according to each example includes, in order from the object side to the image side, a first lens unit B1 having a negative refractive power, a second lens unit B2 having a positive refractive power, and a rear lens unit including third to fifth lens units B3 to B5. The rear lens unit may include two or more lens units. Zooming is performed by moving at least the first lens unit B1 and the second lens unit B2 in the optical axis direction.

The zoom lens has an Fno stop SP disposed between the second lens unit B2 and the third lens unit B3. The Fno stop SP determines an open F-number over the entire zoom range. A negative lens unit NL having a negative refractive power, which is part of the rear lens unit, is disposed on the image side of the Fno stop SP, and a flare cutting stop FS is disposed on the image side of the negative lens unit NL so that these stops are adjacent to each other via a gap. A fourth lens unit B4 that moves integrally in the optical axis direction during zooming includes the negative lens unit NL and the flare cutting stop FS. As described above, the aperture diameter of the flare cutting stop FS changes according to zooming.

On the image side of the flare cutting stop FS, a positive lens unit PL having a positive refractive power is disposed as a fifth lens unit B5 which is adjacent to the flare cutting stop FS.

The zoom lens in each example may satisfy at least one of the following conditional expressions (1) and (2):

$$1.01 \leq \varphi W/\varphi T \leq 2.00 \tag{1}$$

$$0.10 \leq FDw/LDw \leq 0.50 \tag{2}$$

In the conditional expression (1), $\varphi W$ is an aperture diameter of the flare cutting stop FS at the wide-angle end, and $\varphi T$ is an aperture diameter of the flare cutting stop FS at the telephoto end. In the conditional expression (2), FDw is a distance on the optical axis from the flare cutting stop FS to the image plane at the wide-angle end, and LDw is an overall length of the zoom lens at the wide-angle end. The overall length of the zoom lens is a distance from the object side surface of the most object side lens (front lens surface) to the image side surface of the most image side lens (final lens surface). If an optical element, such as a prism and a filter, that has substantially no refractive power is inserted between the final lens surface and the image plane, the overall length of the zoom lens is defined by excluding this optical element and by converting the space into air. If an optical element, such as a cover glass and the filter, that has substantially no refractive power is disposed on the object side of the front lens surface, the optical element is not regarded as the first lens unit.

The conditional expression (1) specifies the ratio of the aperture diameter at the wide-angle end and the aperture diameter at the telephoto end of the flare cutting stop FS. If the aperture diameter of the flare cutting stop FS increases at the telephoto end and the value of $\varphi W/\varphi T$ is lower than the lower limit of the conditional expression (1), from a middle zoom position to the telephoto end, an amount of the light beam from an intermediate image height that enters the aperture of the flare cutting stop FS is so large that it is difficult to suppress a coma, which may not maintain the high optical performance of the zoom lens. If the aperture diameter of the flare cutting stop FS increases at the wide-angle end and the value of $\varphi W/\varphi T$ is higher than the upper limit of the conditional expression (1), the size of the zoom lens may increase. Thus, when the conditional expression (1) is satisfied, it is possible to acquire the high optical performance by properly cutting unnecessary light while the size of the zoom lens is reduced.

The conditional expression (2) specifies the position of the flare cutting stop FS at the wide-angle end. If the flare cutting stop FS is disposed on the object side and the value of FDw/LDw is higher than the upper limit of the conditional expression (2), at the position of the flare cutting stop FS, the difference between the diameter of the light beam that determines Fno and the diameter of an off-axis light beam is small, which may decrease an effect of cutting the light beam. If the flare cutting stop FS is disposed on the image side and the value of FDw/LDw is lower than the lower limit of the conditional expression (2), the aperture diameter of the flare-cutting stop FS is so large that the size of the zoom lens may increase. Thus, when the conditional expression (2) is satisfied, it is possible to acquire the high optical performance by properly cutting the unnecessary light while the size of the zoom lens is reduced.

Further, the zoom lens in each example may satisfy at least one of the following conditional expressions (3) to (10).

$$0.10 \leq BFw/fw \leq 1.20 \tag{3}$$

$$5.0 \leq LDw/fw \leq 15.0 \tag{4}$$

$$0.10 \leq SFDw/LDw \leq 0.50 \tag{5}$$

$$0.50 \leq (SFDt+FDt)/LDt \leq 0.90 \tag{6}$$

$$0.50 \leq |f\_NL|/ft \leq 3.00 \tag{7}$$

$$0.50 \leq f\_PL/ft \leq 2.50 \tag{8}$$

$$1.40 \leq Nd\_PLL \leq 1.65 \tag{9}$$

$$60 \leq vd\_PLL \leq 100 \tag{10}$$

In the conditional expression (3), BFw is a backfocus of the zoom lens at the wide-angle end, and fw is a focal length of the zoom lens at the wide-angle end. The backfocus is a distance from the final lens surface to the image plane. If the optical element, such as the prism and the filter, having substantially no refractive power is inserted between the final lens surface and the image surface, the backfocus is defined by excluding this optical element and by converting the space into air.

In the conditional expressions (5) and (6), SFDw is a distance between the Fno stop SP and the flare cutting stop FS at the wide-angle end and SFDt is a distance between the Fno stop SP and the flare cutting stop FS at the telephoto end. In the conditional expression (6), FDt is a distance from the flare cutting stop FS to the image plane at the telephoto end, and LDt is an overall length of the zoom lens at the telephoto end.

In the conditional expressions (7) and (8), f_NL is a focal length of the negative lens unit NL, and f_PL is a focal length of the positive lens unit PL. Further, in the conditional expressions (9) and (10), Nd_PLL is a refractive index to the d-line of a material of a positive lens PLL included in the positive lens unit PL, and vd_PLL is an Abbe number of the material of the positive lens PLL.

The conditional expression (3) specifies the backfocus of the zoom lens at the wide-angle end. If the backfocus increases and the value of BFw/fw is higher than the upper limit of the conditional expression (3), the overall length of the zoom lens becomes large, which may increase the size of the zoom lens. If the backfocus decreases and the value of BFw/fw is lower than the lower limit of the conditional expression (3), an outer diameter of the lens on the image side increases, and a mechanical member configured to hold and drive the lens increases. Thus, the size of the zoom lens may increase.

The conditional expression (4) specifies the overall length of the zoom lens at the wide-angle end. If the value of LDw/fw is higher than the upper limit of the conditional expression (4), the overall length of the zoom lens increases, which may increase the size of the zoom lens. If the value of LDw/fw is lower than the lower limit of the conditional expression (4), the focal length of each lens unit necessary for zooming in each example becomes short, which may not maintain the high optical performance over the entire zoom range.

The conditional expression (5) specifies a distance between the Fno stop SP and the flare cutting stop FS at the wide-angle end. If the Fno stop SP and the flare cutting stop FS are close to each other and the value of SFDw/LDw is lower than the lower limit of the conditional expression (5), the unnecessary light may not be effectively cut. If the value of SFDw/LDw is higher than the upper limit of the conditional expression (5), the flare cutting stop FS approaches to the image plane, increasing its aperture diameter or the Fno stop SP may be too close to the object side, increasing its aperture diameter. In both cases, the size of the zoom lens may increase.

The conditional expression (6) specifies the position of the Fno stop SP at the telephoto end. If the Fno stop SP is disposed on the image side and the value of (SFDt+FDt)/LDt is lower than the lower limit of the conditional expression (6), the diameter of the front lens surface (front lens diameter) increases, which may increase the size of the zoom lens. If the Fno stop is disposed on the object side and the value of (SFDt+FDt)/LDt is higher than the upper limit of the conditional expression (6), the diameter of the final lens surface (rear lens diameter) increases, which may increase the size of the zoom lens.

The conditional expression (7) specifies the focal length of the negative lens unit NL. If the refractive power of the negative lens unit NL decreases and the value of |f_NL|/ft is higher than the upper limit of the conditional expression (7), the size of the zoom lens may increase. If the refractive power of the negative lens unit NL increases and the value of |f_NL|/ft is lower than the lower limit of the conditional expression (7), the coma may not be suppressed at the telephoto end.

The conditional expression (8) specifies the focal length of the positive lens unit PL. If the refractive power of the positive lens unit PL decreases and the value of f_PL/ft is higher than the upper limit value of the conditional expression (8), the size of the zoom lens may increase. If the refractive power of the positive lens unit PL increases and the value of f_PL/ft is lower than the lower limit of the conditional expression (8), the Petzval sum increases to a negative side, which may increase a field curvature to an overexposure side.

The conditional expression (9) specifies the refractive index Nd_PLL of the positive lens PLL included in the positive lens unit PL. If the refractive index Nd_PLL is higher than the upper limit value of the conditional expression (9), the Petzval sum increases to the negative side, which may increase the field curvature to the overexposure side. If the refractive index Nd_PLL is lower than the lower limit of the conditional expression (9), a mass producible material may not be obtained.

The conditional expression (10) specifies the Abbe number vd_PLL of the positive lens PLL described above. If the Abbe number vd_PLL is higher than the upper limit value of the conditional expression (10), the mass producible material may not be obtained. If the Abbe number vd_PLL is lower than the lower limit of the conditional expression (10), the lateral chromatic aberration may not be well corrected at the wide-angle end.

In each example, the negative lens unit NL, the flare cutting stop FS, and the positive lens unit PL are adjacently disposed in this order from the object side. Due to such an arrangement, it is possible to reduce the size of the negative lens unit NL. In addition, since an on-axis light beam and an off-axis light beam passing through the positive lens unit PL are separated from each other, when the lenses in the positive lens unit PL are properly arranged, it is possible to easily correct the off-axis aberration, such as the lateral chromatic aberration. In particular, as described in the conditional expression (1), when the aperture diameter of the flare cutting stop FS increases at the wide-angle end and decreases at the telephoto end, it is possible to simultaneously reduce the lateral chromatic aberration at the wide-angle end and the coma from the intermediate zoom range to the telephoto end.

In each example, an image stabilization is performed to reduce the image blur occurring from the camera shake by moving the negative lens unit NL in a direction orthogonal to the optical axis (or a direction including a component orthogonal to the optical axis). However, the image stabilization may be performed using all or part of other lens units.

As described above, each example can obtain a compact zoom lens that has the high optical performance over the entire zoom range while including the Fno stop and the flare cutting stop.

The zoom lens according to each example may satisfy at least one of the following conditional expressions (1a) to (10a).

$$1.03 \leq \varphi W/\varphi T \leq 1.50 \tag{1a}$$

$$0.18 \leq FDw/LDw \leq 0.44 \tag{2a}$$

$$0.40 \leq BFw/fw \leq 1.10 \tag{3a}$$

$$7.0 \leq LDw/fw \leq 14.0 \tag{4a}$$

$$0.12 \leq SFDw/LDw \leq 0.40 \tag{5a}$$

$$0.55 \leq (SFDt+FDt)/LDt \leq 0.80 \tag{6a}$$

$$0.80 \leq |f\_NL|/ft \leq 2.80 \tag{7a}$$

$$0.80 \leq f\_PL/ft \leq 2.30 \tag{8a}$$

$$1.45 \leq Nd\_PLL \leq 1.56 \tag{9a}$$

$$74 \leq vd\_PLL \leq 94 \tag{10a}$$

The zoom lens according to each example may satisfy at least one of the following conditional expressions (1b) to (10b).

$$1.05 \leq \varphi W/\varphi T \leq 1.25 \tag{1b}$$

$$0.25 \leq FDw/LDw \leq 0.38 \tag{2b}$$

$$0.70 \leq BFw/fw \leq 1.05 \tag{3b}$$

$$8.0 \leq LDw/fw \leq 13.0 \tag{4b}$$

$$0.15 \leq SFDw/LDw \leq 0.30 \tag{5b}$$

$$0.60 \leq (SFDt+FDt)/LDt \leq 0.75 \tag{6b}$$

$$1.20 \leq |f\_NL|/ft \leq 2.50 \tag{7b}$$

$$1.20 \leq f\_PL/ft \leq 2.10 \tag{8b}$$

$$1.49 \leq Nd\_PLL \leq 1.51 \tag{9b}$$

$$80 \leq vd\_PLL \leq 85 \tag{10b}$$

Hereafter, a detailed description for Examples 1 to 3 will be given.

EXAMPLE 1

A zoom lens according to Example 1 illustrated in FIGS. 1A and 1B includes, in order from the object side to the image side, a first lens unit B1 having a negative refractive power, a second lens unit B2 having a positive refractive power, a third lens unit B3 having a positive refractive power, a fourth lens unit B4 having a negative refractive power, and a fifth lens unit B5 having a positive refractive power.

During zooming from the wide-angle end to the telephoto end, the first lens unit B1 moves to the image side, and the second to fifth lens units B2 to B5 move to the object side. At this time, a distance between the first lens unit B1 and the second lens unit B2 narrows, and a distance between the second lens unit B2 and the third lens unit B3 narrows. A distance between the third lens unit B3 and the fourth lens unit B4 widens, and a distance between the fourth lens unit B4 and the fifth lens unit B5 narrows.

An Fno stop SP is disposed between the second lens unit B2 and the third lens unit B3. The Fno stop SP moves to the object side along a different trajectory from those of the second lens unit B2 and the third lens unit B3 during zooming from the wide-angle end to the telephoto end. A flare cutting stop FS is disposed on the side closest to the image of the fourth lens unit B4. The aperture diameter of the flare cutting stop FS narrows during zooming from the wide-angle end to the telephoto end.

The second lens unit B2 is a focus lens unit that moves in the optical axis direction for focusing. The second lens unit B2 moves from the object side to the image side during focusing from the object at infinity to the closest object. The fourth lens unit B4 moves relative to the optical axis and performs the image stabilization.

Figure 2B:
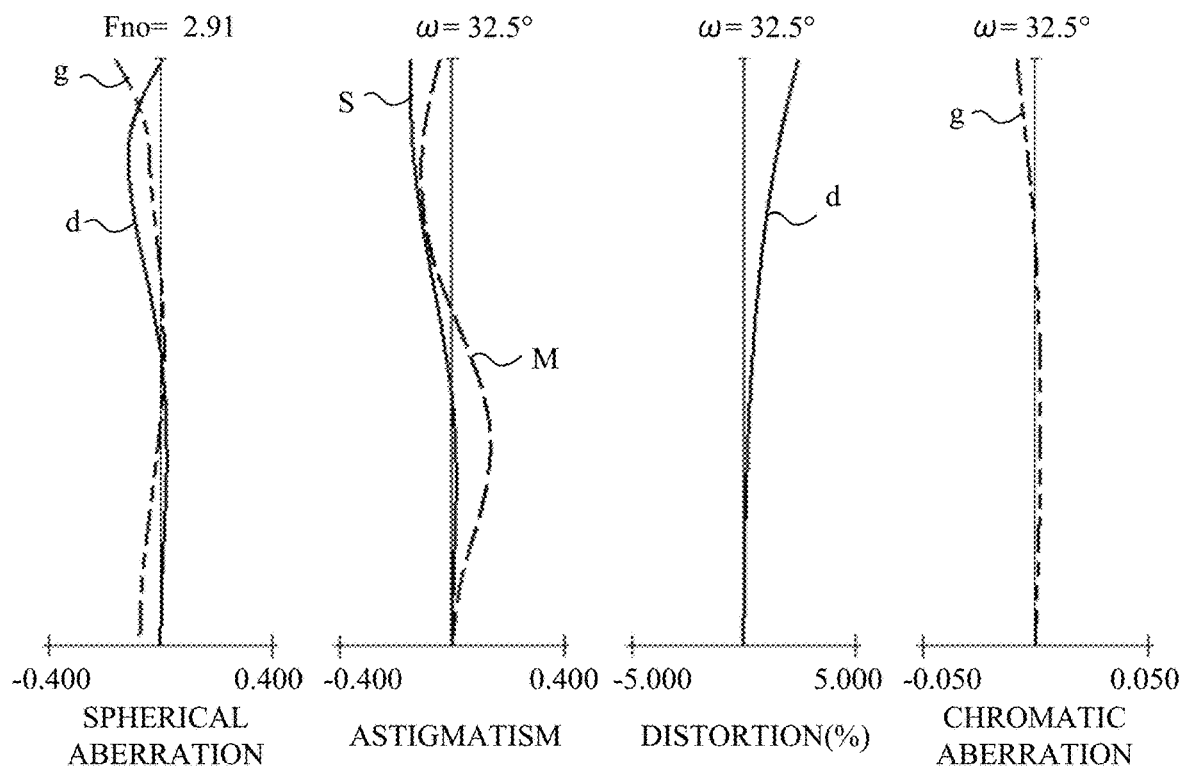

Numerical example 1 corresponding to this example will be given after a description of Example 3. FIGS. 2A and 2B are longitudinal aberration diagrams of the zoom lens according to this example (numerical example 1) when the object at infinity is in an in-focus state at the wide-angle end and the telephoto end.

EXAMPLE 2

Optical configurations of a zoom lens according to Example 2 described in FIGS. 3A and 3B are the same as that of Example 1. A moving direction of each lens unit and changes in distances between the lens units during zooming from the wide-angle end to the telephoto end are the same as those of Example 1. Even in this example, the aperture diameter of the flare cutting stop FS narrows during zooming from the wide-angle end to the telephoto end.

Even in this example, a second lens unit B2 is a focus lens unit, and moves from the object side to the image side during focusing from the object at infinity to the closest object. A fourth lens unit B4 moves relative to the optical axis and performs the image stabilization.

Figure 4A:
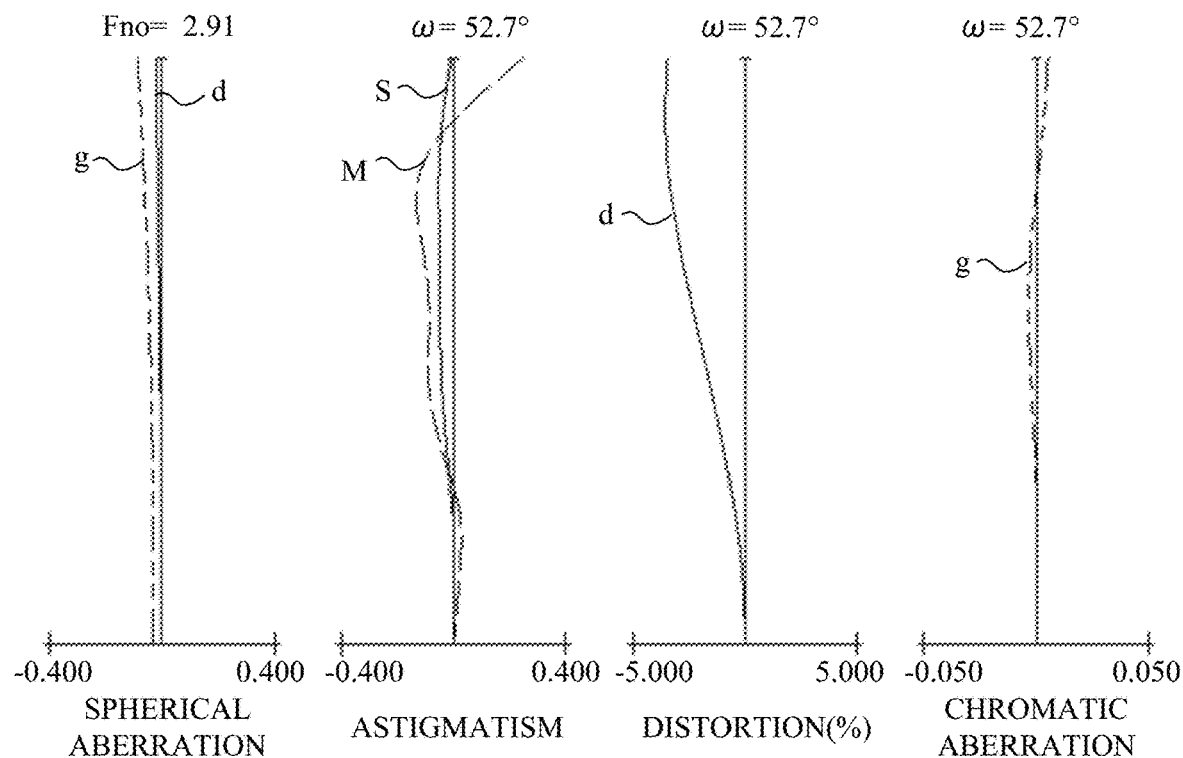
FIGS. 4A and 4B are aberration diagrams of the zoom lens according to Example 2.
Figure 4B:
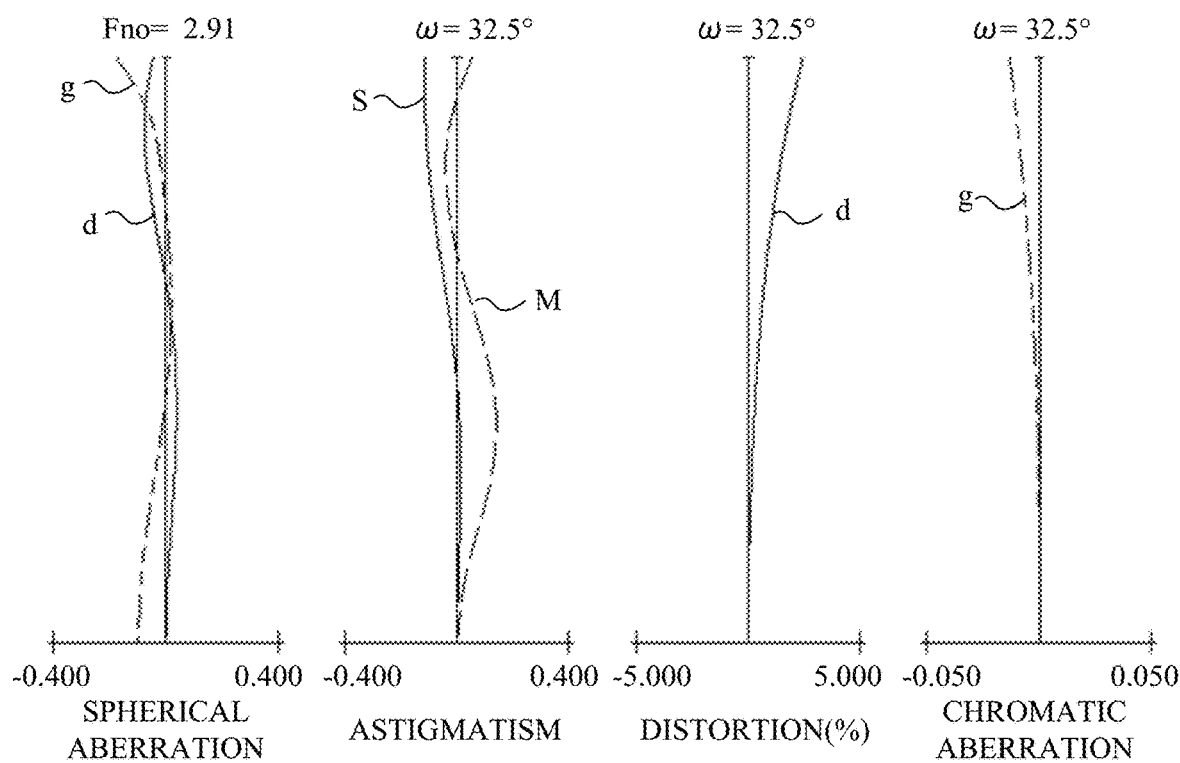

Numerical example 2 corresponding to this example will be given after the description for Example 3. FIGS. 4A and 4B are longitudinal aberration diagrams of the zoom lens according to this example (numerical example 2) when the object at infinity is in an in-focus state at the wide-angle end and the telephoto end.

EXAMPLE 3

The optical configuration of a zoom lens according to Example 3 described in FIGS. 5A and 5B is the same as that of Example 1. A moving direction of each lens unit and changes in distances between the lens units during zooming from the wide-angle end to the telephoto end are the same as those of Example 1. Even in this example, the aperture diameter of a flare cutting stop FS narrows during zooming from the wide-angle end to the telephoto end.

Even in this example, a second lens unit B2 is a focus lens unit, and moves from the object side to the image side during focusing from the object at infinity to the closest object. A fourth lens unit B4 moves relative to the optical axis and performs the image stabilization.

Figure 6A:
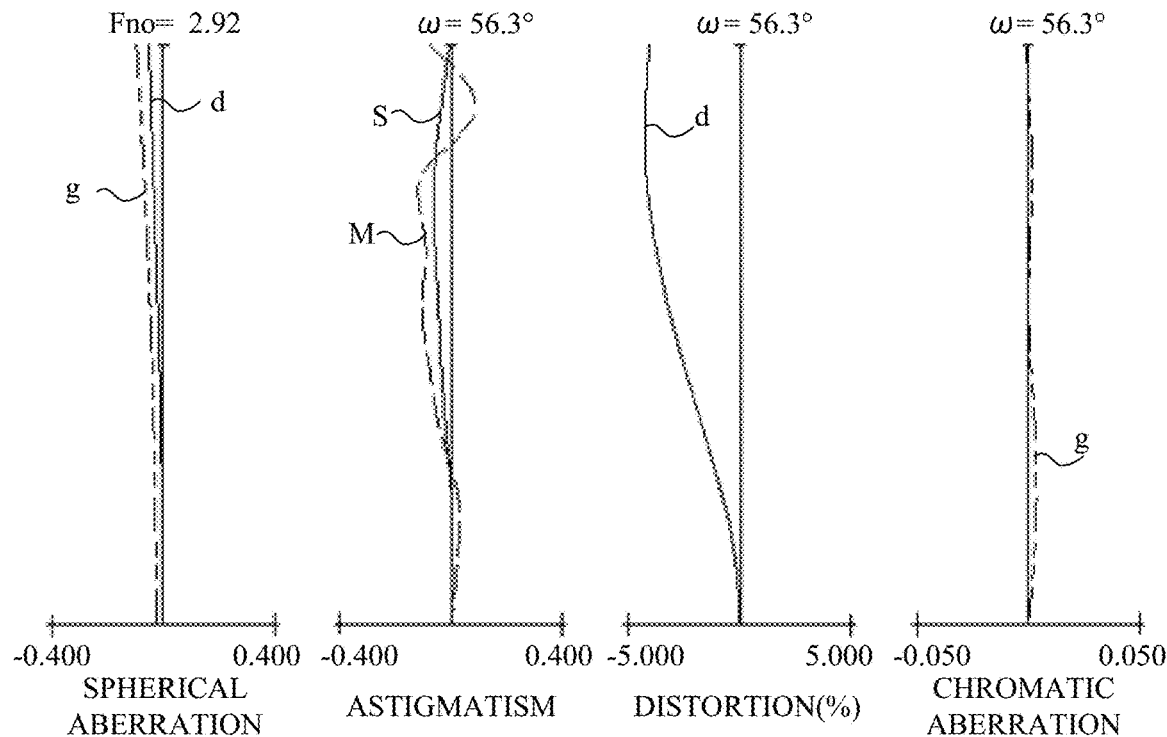
FIGS. 6A and 6B are aberration diagrams of the zoom lens according to Example 3.
Figure 6B:
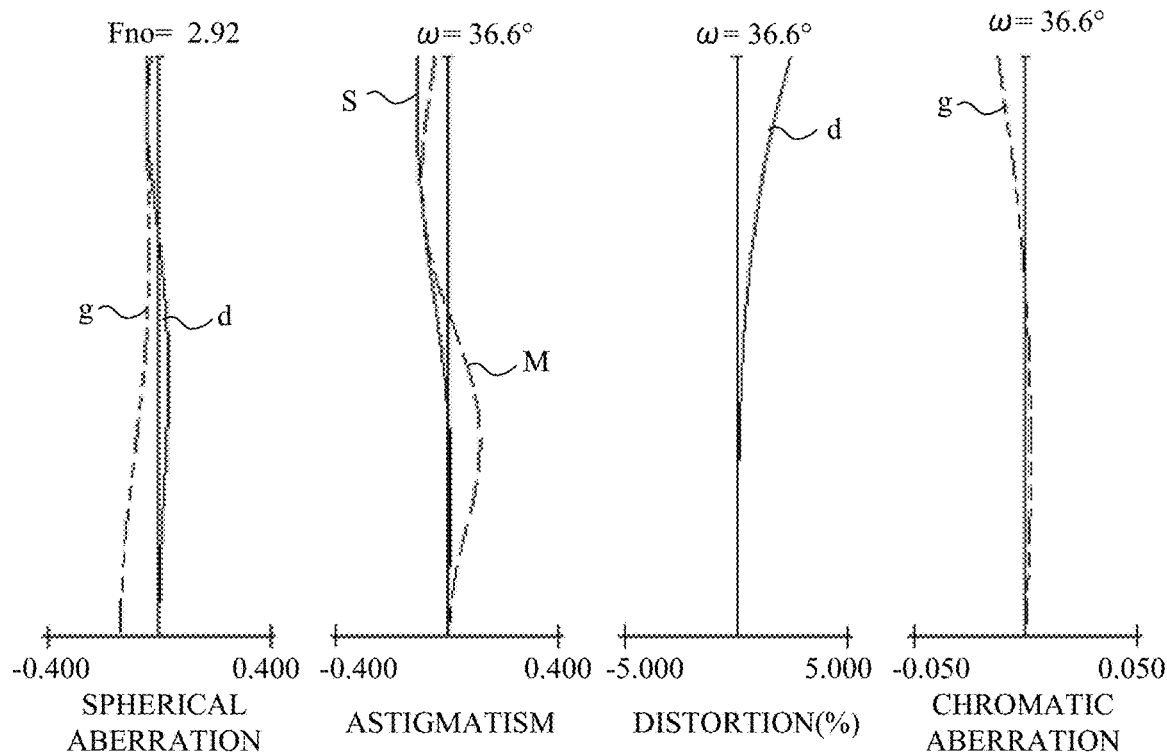

Numerical example 3 corresponding to this example will be given after the description for Example 3. FIGS. 6A and 6B are longitudinal aberration diagrams of the zoom lens according to this example (numerical example 3) when the object at infinity is in an in-focus state at the wide-angle end and the telephoto end.

Each example described above is merely a representative example, and various modifications and changes can be made to each example in carrying out the present invention. For example, according to Examples 1 to 3, one lens unit moves as the focus lens unit, but a plurality of lens units may move using a floating focus method. Examples 1 to 3 are the zoom lenses that use only the refraction, but may be zoom lenses that use the diffraction or reflection.

Now, numerical examples 1 to 3 will be given below. In each numerical example, ri is a radius of curvature (mm) of an i-th surface from the object side, di is a lens thickness or an air gap (mm) between the i-th and an (i+1)-th surfaces, and ndi is each refractive index to the d-line of a material of the i-th optical element. vdi is an Abbe number of the material of the i-th optical element to the d-line. BF is a backfocus (mm). A "backfocus" is an air-converted length of a distance on the optical axis from a final surface of the zoom lens (lens surface closest to the image side) to a paraxial image plane. An "overall lens length" is a length obtained by adding the backfocus to a distance on the optical axis from a front surface (lens surface closest to the object) of the zoom lens to the final surface.

Where Nd, NF, and NC are refractive indices to the Fraunhofer d-line (587.6 nm), F-line (486.1 nm), and C-line (656.3 nm), the Abbe number vd of a certain material is expressed by the following expression:

$$vd=(Nd-1)/(NF-NC)$$

"*" attached to the surface number represents that the surface has an aspherical shape. Where an optical axis direction is the X axis, a direction orthogonal to the optical axis is the H axis, and a traveling direction of the light is positive, and R is a paraxial curvature radius, K is a conic constant, and A4, A6, A8, A10, A12, A14, and A16 are aspheric coefficients, the aspherical shape is expressed by the following expression:

$$X = \frac{H^2/R}{1+\sqrt{1-(1+K)(H/R)^2}} + A4 \cdot H^4 + A6 \cdot H^6 + A8 \cdot H^8 + A10 \cdot H^{10} + A12 \cdot H^{12} + A14 \cdot H^{14} + A16 \cdot H^{16}$$

The aspherical coefficient "e-x" represents 10-x.

Table 1 summarizes the values corresponding to the conditional expressions (1) to (10) described above in numerical examples 1 to 3.

NUMERICAL EXAMPLE 1

| | | Surface data | | | |
|---|---|---|---|---|---|
| Surface Number | ri | di | ndi | vdi | Effective diameter (mm) |
| 1* | 3000.000 | 2.85 | 1.58313 | 59.4 | 55.04 |
| 2* | 16.526 | 10.57 | | | 37.84 |
| 3* | −809.327 | 2.25 | 1.85400 | 40.4 | 36.45 |
| 4* | 91.828 | 5.56 | | | 31.48 |
| 5 | −53.256 | 1.20 | 1.59522 | 67.7 | 31.18 |
| 6 | 68.528 | 0.15 | | | 30.87 |
| 7 | 43.587 | 5.03 | 1.85478 | 24.8 | 31.10 |
| 8 | −485.244 | (variable) | | | 30.62 |
| 9 | 63.607 | 2.67 | 1.84666 | 23.9 | 24.64 |
| 10 | −1472.964 | 0.15 | | | 24.78 |
| 11 | 52.737 | 1.00 | 1.92286 | 20.9 | 25.07 |
| 12 | 22.996 | 5.41 | 1.53172 | 48.8 | 24.62 |
| 13 | 489.976 | (variable) | | | 24.90 |
| 14(diaphragm) | ∞ | (variable) | | | (variable) |
| 15 | 27.733 | 1.20 | 2.00069 | 25.5 | 27.72 |
| 16 | 19.641 | 9.29 | 1.53775 | 74.7 | 26.54 |
| 17 | −78.882 | (variable) | | | 26.33 |
| 18 | −67.558 | 4.31 | 1.92286 | 20.9 | 21.98 |
| 19 | −20.948 | 0.77 | 1.83400 | 37.2 | 22.48 |
| 20 | 136.126 | 3.52 | | | 23.78 |
| 21 | ∞ | (variable) | | | (variable) |
| 22 | 30.487 | 11.20 | 1.49700 | 81.6 | 34.86 |
| 23 | −50.182 | 0.15 | | | 34.68 |
| 24 | 40.928 | 11.00 | 1.49700 | 81.6 | 31.47 |
| 25 | −25.800 | 1.20 | 2.05090 | 26.9 | 29.51 |
| 26 | 208.835 | 4.54 | | | 29.48 |
| 27* | −73.669 | 2.10 | 1.85400 | 40.4 | 29.55 |
| 28* | −1000.000 | 0.15 | | | 32.11 |
| 29 | 216.036 | 3.40 | 1.92286 | 20.9 | 34.25 |
| 30 | −127.538 | (variable) | | | 34.88 |
| image plane | ∞ | | | | |

ASPHERIC DATA

First surface $K = 0.00000e+000$ $A4 = 8.30213e-006$ $A6 = -1.33976e-008$ $A8 = 4.25008e-011$
$A10 = -8.60253e-014$ $A12 = 1.03363e-016$ $A14 = -7.03702e-020$ $A16 = 2.16318e-023$ Second surface $K = -9.81344e-001$ $A4 = 4.49709e-007$ $A6 = -2.34544e-008$ $A8 = -1.05516e-010$
$A10 = 8.07443e-013$ $A12 = -2.78552e-015$ $A14 = 3.05128e-018$ Third surface $K = 0.00000e+000$ $A4 = -9.01759e-006$ $A6 = -1.39642e-007$ $A8 = 1.23272e-009$
$A10 = -3.49283e-012$ $A12 = 3.62808e-015$ $A14 = 5.24953e-019$ $A16 = -2.43479e-021$ Fourth surface $K = 0.00000e+000$ $A4 = 6.34981e-006$ $A6 = -1.29871e-007$ $A8 = 1.67920e-009$
$A10 = -6.48374e-012$ $A12 = 1.50043e-014$ $A14 = -1.59777e-017$ Twenty-seventh surface $K = 0.00000e+000$ $A4 = -8.04129e-005$ $A6 = 2.64851e-007$ $A8 = -1.06038e-009$
$A10 = 4.87911e-012$ $A12 = -8.56493e-015$ $A14 = -1.17880e-018$ $A16 = -3.10043e-023$ Twenty-eighth surface $K = 0.00000e+000$ $A4 = -6.00659e-005$ $A6 = 2.67376e-007$ $A8 = -7.05021e-010$
$A10 = 2.04492e-012$ $A12 = -2.97985e-015$

VARIOUS DATA

| Zoom ratio 2.20 | Wide angle | Middle | Telephoto |
|---|---|---|---|
| Focal length (mm) | 15.45 | 24.00 | 33.95 |
| F-number | 2.91 | 2.91 | 2.91 |
| Half angle of view (°) | 54.47 | 42.03 | 32.51 |
| Image height (mm) | 21.64 | 21.64 | 21.64 |
| Overall lens length (mm) | 159.58 | 147.49 | 144.99 |
| BF(mm) | 14.00 | 22.21 | 32.15 |
| d 8 | 25.32 | 7.72 | 1.50 |
| d13 | 8.24 | 11.30 | 7.40 |
| d14 | 13.71 | 5.42 | 0.71 |

-continued

|     |       |       |       |
|-----|-------|-------|-------|
| d17 | 1.60  | 9.89  | 14.61 |
| d21 | 7.04  | 1.27  | −1.05 |
| d30 | 14.00 | 22.21 | 32.15 |

EFFECTIVE DIAMETER DATA (mm)

|  | Wide angle | Middle | Telephoto |
|---|---|---|---|
| Fourteenth surface (Fno stop) | 16.52 | 20.93 | 26.65 |
| Twenty-first surface (Flare cutting stop) | 25.93 | 22.49 | 21.91 |

ZOOM LENS UNIT DATA

| Unit | Starting Surface | Focal length | Lens structure length | Front principal point position | Rear principal point position |
|---|---|---|---|---|---|
| 1 | 1  | −21.75 | 27.61 | 3.35  | −19.34 |
| 2 | 9  | 73.31  | 9.23  | −0.96 | −6.54  |
| 3 | 14 | ∞      | 0.00  | 0.00  | −0.00  |
| 4 | 15 | 52.20  | 10.49 | 1.65  | −5.23  |
| 5 | 18 | −63.99 | 8.60  | 0.43  | −5.73  |
| 6 | 22 | 51.49  | 33.74 | −7.53 | −27.53 |

SINGLE LENS DATA

| Lens | Starting surface | Focal length |
|---|---|---|
| 1  | 1  | −28.51 |
| 2  | 3  | −96.46 |
| 3  | 5  | −50.16 |
| 4  | 7  | 47.00  |
| 5  | 9  | 72.07  |
| 6  | 11 | −44.91 |
| 7  | 12 | 45.20  |
| 8  | 15 | −72.66 |
| 9  | 16 | 30.24  |
| 10 | 18 | 31.50  |
| 11 | 19 | −21.72 |
| 12 | 22 | 40.00  |
| 13 | 24 | 33.68  |
| 14 | 25 | −21.79 |
| 15 | 27 | −93.22 |
| 16 | 29 | 87.31  |

NUMERICAL EXAMPLE 2

Surface data

| Surface Number | ri | di | ndi | vdi | Effective diameter (mm) |
|---|---|---|---|---|---|
| 1*  | 3000.000  | 2.85       | 1.58313 | 59.4 | 51.80 |
| 2*  | 16.094    | 9.83       |         |      | 36.24 |
| 3*  | −3000.000 | 2.25       | 1.85400 | 40.4 | 35.05 |
| 4*  | 94.780    | 5.52       |         |      | 30.76 |
| 5   | −48.479   | 1.22       | 1.59522 | 67.7 | 30.48 |
| 6   | 88.437    | 0.15       |         |      | 30.43 |
| 7   | 45.716    | 4.61       | 1.84666 | 23.9 | 30.72 |
| 8   | −800.000  | (variable) |         |      | 30.33 |
| 9   | 67.202    | 2.80       | 1.85478 | 24.8 | 24.21 |
| 10  | −321.896  | 0.15       |         |      | 24.38 |
| 11  | 55.662    | 1.04       | 1.92286 | 20.9 | 24.66 |
| 12  | 23.425    | 5.12       | 1.53172 | 48.8 | 24.24 |
| 13  | 545.072   | (variable) |         |      | 24.50 |
| 14(diaphragm) | ∞ | (variable) |   |      | (variable) |
| 15  | 27.357    | 1.25       | 2.00069 | 25.5 | 27.18 |
| 16  | 19.481    | 8.91       | 1.53775 | 74.7 | 26.02 |
| 17  | −90.471   | (variable) |         |      | 25.79 |
| 18  | −76.370   | 4.80       | 1.92286 | 20.9 | 22.15 |
| 19  | −22.599   | 0.97       | 1.83400 | 37.2 | 22.15 |
| 20  | 128.497   | 3.55       |         |      | 22.58 |
| 21  | ∞         | (variable) |         |      | (variable) |
| 22  | 29.814    | 10.71      | 1.49700 | 81.6 | 33.81 |
| 23  | −51.511   | 0.15       |         |      | 33.66 |
| 24  | 43.147    | 10.29      | 1.49700 | 81.6 | 30.98 |
| 25  | −28.537   | 1.23       | 2.05090 | 26.9 | 29.07 |

-continued

| | | | | | |
|---|---|---|---|---|---|
| 26 | 264.650 | 4.92 | | | 28.84 |
| 27* | −58.899 | 1.90 | 1.85400 | 40.4 | 28.87 |
| 28* | −481.984 | 0.15 | | | 31.35 |
| 29 | 196.609 | 3.51 | 1.92286 | 20.9 | 33.25 |
| 30 | −143.123 | (variable) | | | 33.99 |
| image plane | ∞ | | | | |

ASPHERIC DATA

First surface

K = 0.00000e+000 A 4 = 7.78177e−006 A 6 = −1.16227e−008 A 8 = 3.61332e−011
A10 = −8.46807e−014 A12 = 1.32014e−016 A14 = −1.19838e−019 A16 = 4.73739e−023

Second surface

K = −9.92823e−001 A 4 = 7.69669e−007 A 6 = −2.26384e−008 A 8 = −9.85352e−011
A10 = 6.27986e−013 A12 = −2.83991e−015 A14 = 3.85776e−018

Third surface

K = 0.00000e+000 A 4 = −6.64637e−006 A 6 = −1.30881e−007 A 8 = 1.16505e−009
A10 = −3.85853e−012 A12 = 6.70940e−015 A14 = −6.86586e−018 A16 = 3.70998e−021

Fourth surface

K = 0.00000e+000 A 4 = 8.70231e−006 A 6 = −1.20128e−007 A 8 = 1.60621e−009
A10 = −6.68148e−012 A12 = 1.72715e−014 A14 = −1.99239e−017

Twenty-seventh surface

K = 0.00000e+000 A 4 = −8.02584e−005 A 6 = 3.37144e−007 A 8 = −1.26027e−009
A10 = 4.18861e−012 A12 = −7.10161e−015 A14 = 6.02476e−018 A16 = −2.38812e−020

Twenty-eighth surface

K = 0.00000e+000 A 4 = −5.78382e−005 A 6 = 3.44019e−007 A 8 = −1.08923e−009
A10 = 2.82965e−012 A12 = −3.79229e−015

VARIOUS DATA

| Zoom ratio 2.06 | Wide angle | Middle | Telephoto |
|---|---|---|---|
| Focal length (mm) | 16.48 | 25.00 | 33.95 |
| F-number | 2.91 | 2.91 | 2.91 |
| Half angle of view (°) | 52.70 | 40.87 | 32.51 |
| Image height (mm) | 21.64 | 21.64 | 21.64 |
| Overall lens length (mm) | 155.40 | 143.83 | 142.03 |
| BF(mm) | 14.79 | 23.49 | 32.80 |
| d 8 | 21.05 | 6.62 | 1.50 |
| d13 | 6.87 | 9.00 | 6.34 |
| d14 | 16.01 | 6.25 | 1.65 |
| d17 | 1.60 | 9.09 | 12.93 |
| d21 | 7.22 | 1.51 | −1.05 |
| d30 | 14.79 | 23.49 | 32.80 |

EFFECTIVE DIAMETER DATA (mm)

| | Wide angle | Middle | Telephoto |
|---|---|---|---|
| Fourteenth surface (Fno stop) | 16.51 | 20.83 | 25.95 |
| Twenty-first surface (Flare cutting stop) | 24.78 | 22.11 | 22.03 |

ZOOM LENS UNIT DATA

| Unit | Starting Surface | Focal length | Lens structure length | Front principal point position | Rear principal point position |
|---|---|---|---|---|---|
| 1 | 1 | −21.27 | 26.43 | 3.35 | −18.21 |
| 2 | 9 | 68.47 | 9.11 | −0.71 | −6.18 |
| 3 | 14 | ∞ | 0.00 | 0.00 | −0.00 |
| 4 | 15 | 53.46 | 10.16 | 1.27 | −5.36 |
| 5 | 18 | −67.81 | 9.32 | 0.66 | −5.88 |
| 6 | 22 | 51.87 | 32.85 | −7.80 | −27.23 |

SINGLE LENS DATA

| Lens | Starting surface | Focal length |
|---|---|---|
| 1 | 1 | −27.76 |
| 2 | 3 | −107.55 |
| 3 | 5 | −52.43 |
| 4 | 7 | 51.20 |
| 5 | 9 | 65.26 |

| | | -continued |
|---|---|---|
| 6 | 11 | −44.52 |
| 7 | 12 | 45.88 |
| 8 | 15 | −73.44 |
| 9 | 16 | 30.68 |
| 10 | 18 | 33.35 |
| 11 | 19 | −22.98 |
| 12 | 22 | 39.73 |
| 13 | 24 | 36.29 |
| 14 | 25 | −24.46 |
| 15 | 27 | −78.73 |
| 16 | 29 | 90.20 |

NUMERICAL EXAMPLE 3

Surface data

| Surface Number | ri | di | ndi | vdi | Effective diameter (mm) |
|---|---|---|---|---|---|
| 1* | 3000.000 | 2.85 | 1.58313 | 59.4 | 61.51 |
| 2* | 17.203 | 12.67 | | | 40.39 |
| 3* | 5528.803 | 2.25 | 1.85400 | 40.4 | 38.64 |
| 4* | 71.932 | 6.04 | | | 32.69 |
| 5 | −56.210 | 1.20 | 1.59522 | 67.7 | 32.30 |
| 6 | 63.894 | 0.15 | | | 31.59 |
| 7 | 44.388 | 6.72 | 1.85478 | 24.8 | 31.69 |
| 8 | −318.556 | (variable) | | | 30.68 |
| 9 | 63.590 | 2.21 | 1.80518 | 25.4 | 22.43 |
| 10 | 314.826 | 0.15 | | | 22.56 |
| 11 | 45.943 | 1.00 | 1.89286 | 20.4 | 22.87 |
| 12 | 23.359 | 5.00 | 1.54072 | 47.2 | 22.56 |
| 13 | −455.410 | (variable) | | | 22.74 |
| 14(diaphragm) | ∞ | (variable) | | | (variable) |
| 15 | 29.639 | 1.20 | 2.00069 | 25.5 | 24.69 |
| 16 | 20.319 | 7.62 | 1.53775 | 74.7 | 23.77 |
| 17 | −81.736 | (variable) | | | 23.49 |
| 18 | −64.883 | 4.17 | 1.95906 | 17.5 | 20.35 |
| 19 | −23.060 | 0.75 | 1.85026 | 32.3 | 21.21 |
| 20 | 180.484 | 3.27 | | | 22.40 |
| 21 | ∞ | (variable) | | | (variable) |
| 22 | 32.881 | 9.68 | 1.49700 | 81.6 | 31.59 |
| 23 | −43.472 | 0.15 | | | 31.74 |
| 24 | 45.776 | 8.66 | 1.49700 | 81.6 | 29.95 |
| 25 | −32.604 | 1.20 | 2.05090 | 26.9 | 28.72 |
| 26 | 152.153 | 4.38 | | | 28.57 |
| 27* | −82.580 | 2.10 | 1.85400 | 40.4 | 28.64 |
| 28* | −1000.000 | 0.15 | | | 31.18 |
| 29 | 137.445 | 2.72 | 1.92286 | 20.9 | 33.48 |
| 30 | −877.955 | (variable) | | | 34.00 |
| image plane | ∞ | | | | |

ASPHERIC DATA

First surface

K = 0.00000e+000 A 4 = 9.12334e−006 A 6 = −1.42060e−008 A 8 = 4.34729e−011
A10 = −8.74169e−014 A12 = 1.02679e−016 A14 = −6.43096e−020 A16 = 1.68912e−023

Second surface

K = −8.93367e−001 A 4 = 3.79524e−008 A 6 = −5.07064e−009 A 8 = −1.14893e−010
A10 = 9.36196e−013 A12 = −2.65811e−015 A14 = 2.27870e−018

Third surface

K = 0.00000e+000 A 4 = −1.02888e−005 A 6 = −1.38723e−007 A 8 = 1.18981e−009
A10 = −3.41414e−012 A12 = 3.80422e−015 A14 = 2.89821e−019 A16 = −2.70649e−021

Fourth surface

K = 0.00000e+000 A 4 = 4.72216e−006 A 6 = −1.41758e−007 A 8 = 1.65340e−009
A10 = −6.55785e−012 A12 = 1.51299e−014 A14 = −1.52426e−017

Twenty-seventh surface

K = 0.00000e+000 A 4 = −7.04435e−005 A 6 = 2.07231e−007 A 8 = −9.97067e−010
A10 = 4.95238e−012 A12 = −1.12135e−014 A14 = 9.39583e−018 A16 = −2.05544e−020

-continued

| Twenty-eighth surface |
|---|
| K = 0.00000e+000  A 4 = −5.05135e−005  A 6 = 2.12633e−007  A 8 = −6.02723e−010 A10 = 2.05246e−012  A12 = −3.41573e−015 |

VARIOUS DATA

| Zoom ratio 2.02 | Wide angle | Middle | Telephoto |
|---|---|---|---|
| Focal length (mm) | 14.42 | 23.00 | 29.10 |
| F-number | 2.92 | 2.92 | 2.92 |
| Half angle of view (°) | 56.32 | 43.25 | 36.63 |
| Image height (mm) | 21.64 | 21.64 | 21.64 |
| Overall lens length (mm) | 157.53 | 145.54 | 143.01 |
| BF(mm) | 14.20 | 21.84 | 29.07 |
| d 8 | 29.25 | 8.20 | 2.20 |
| d13 | 6.60 | 13.49 | 10.40 |
| d14 | 14.27 | 4.99 | 2.88 |
| d17 | 1.60 | 10.89 | 13.00 |
| d21 | 5.32 | −0.15 | −0.83 |
| d30 | 14.20 | 21.84 | 29.07 |

EFFECTIVE DIAMETER DATA (mm)

| | Wide angle | Middle | Telephoto |
|---|---|---|---|
| Fourteenth surface (Fno stop) | 16.43 | 20.62 | 24.01 |
| Twenty-first surface (Flare cutting stop) | 24.59 | 20.79 | 19.15 |

ZOOM LENS UNIT DATA

| Unit | Starting Surface | Focal length | Lens structure length | Front principal point position | Rear principal point position |
|---|---|---|---|---|---|
| 1 | 1 | −21.82 | 31.88 | 3.79 | −22.38 |
| 2 | 9 | 63.47 | 8.35 | 0.08 | −5.08 |
| 3 | 14 | ∞ | 0.00 | 0.00 | −0.00 |
| 4 | 15 | 57.10 | 8.82 | 1.33 | −4.39 |
| 5 | 18 | −67.60 | 8.19 | 0.13 | −5.67 |
| 6 | 22 | 57.20 | 29.05 | −8.47 | −25.21 |

SINGLE LENS DATA

| Lens | Starting surface | Focal length |
|---|---|---|
| 1 | 1 | −29.68 |
| 2 | 3 | −85.36 |
| 3 | 5 | −50.05 |
| 4 | 7 | 45.97 |
| 5 | 9 | 98.58 |
| 6 | 11 | −54.36 |
| 7 | 12 | 41.24 |
| 8 | 15 | −69.01 |
| 9 | 16 | 31.07 |
| 10 | 18 | 35.57 |
| 11 | 19 | −24.01 |
| 12 | 22 | 39.32 |
| 13 | 24 | 39.77 |
| 14 | 25 | −25.47 |
| 15 | 27 | −105.51 |
| 16 | 29 | 128.94 |

| | | | NUMERICAL EXAMPLE | | |
|---|---|---|---|---|---|
| | | | 1 | 2 | 3 |
| EXPRES- SION | (1) | φW/φT | 1.054 | 1.082 | 1.144 |
| | (2) | FDw/LDw | 0.343 | 0.353 | 0.308 |
| | (3) | BFw/fw | 0.906 | 0.897 | 0.985 |
| | (4) | LDw/fw | 10.329 | 9.430 | 10.925 |
| | (5) | SFDw/LDw | 0.216 | 0.239 | 0.209 |
| | (6) | (SFDt + FDt)/LDt | 0.684 | 0.695 | 0.631 |
| | (7) | |f_NL/ft| | 1.885 | 1.997 | 2.323 |
| | (8) | f_PL/ft | 1.517 | 1.528 | 1.966 |

-continued

| | | NUMERICAL EXAMPLE | | |
|---|---|---|---|---|
| | | 1 | 2 | 3 |
| (9) | Nd_PLL | 1.4790 | 1.4970 | 1.4970 |
| (10) | υ d_PLL | 81.61 | 81.61 | 81.61 |

EXAMPLE 4

Figure 7A:
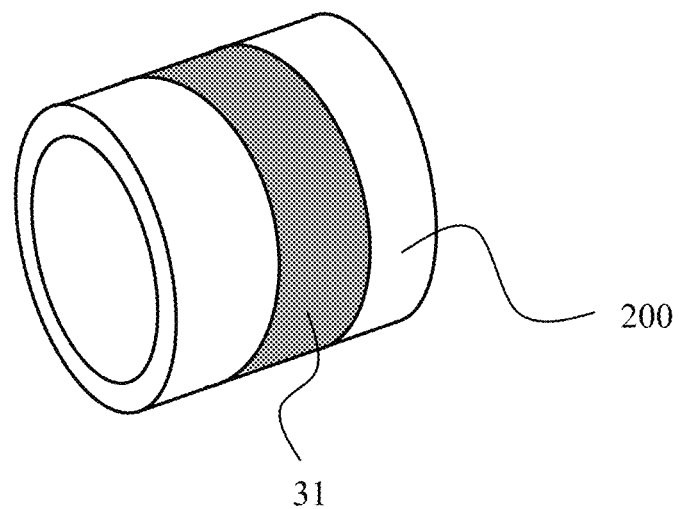
FIG. 7A is a perspective view of an interchangeable lens according to Example 4.
Figure 7B:
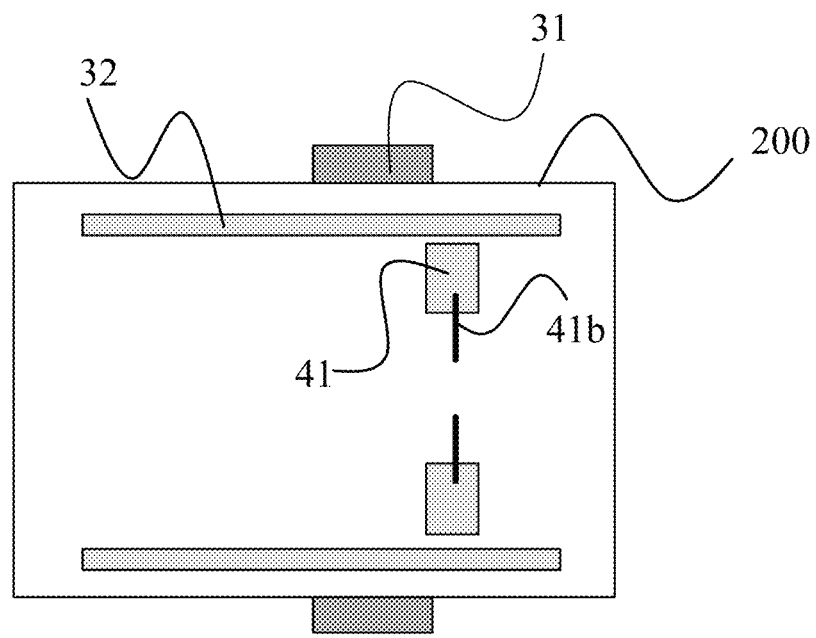
FIG. 7B is a sectional view of the interchangeable lens.
Figure 7C:
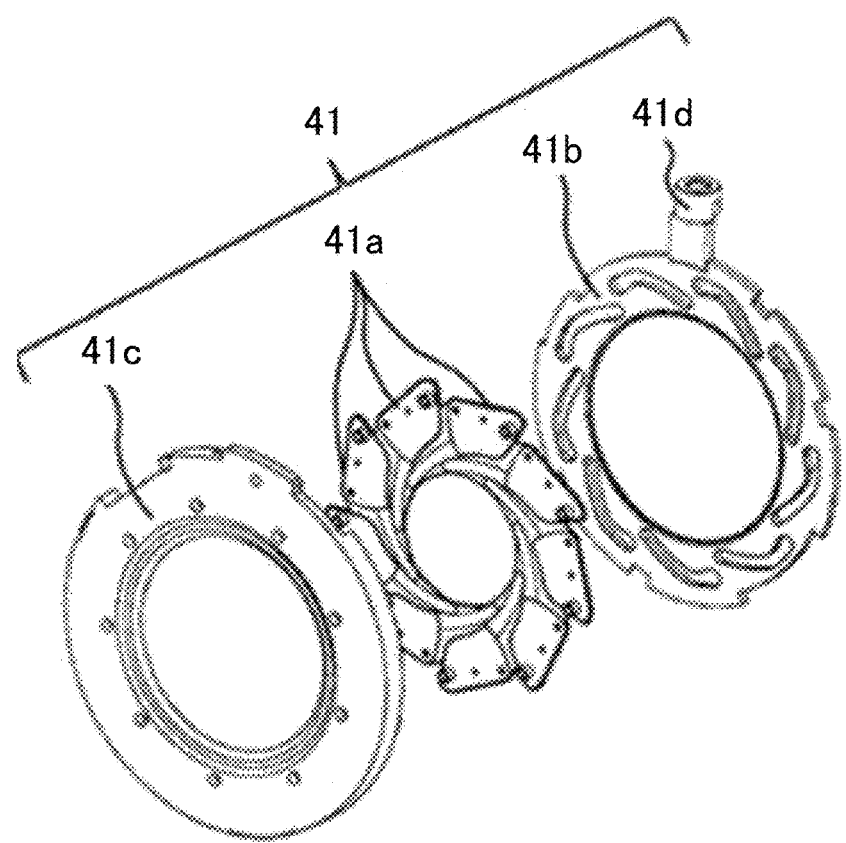
FIG. 7C is an exploded perspective view of the flare cutting stop used in the interchangeable lens.

FIGS. 7A and 7B illustrate a lens apparatus 200 according to Example 4. The lens apparatus 200 includes any of the zoom lenses according to Examples 1 to 3 as a built-in imaging optical system, and a zoom ring (zoom unit) 31 which a user rotates around the optical axis to make the zoom lens perform a zooming operation. When the zoom ring 31 rotates, a cam cylinder 32 rotates, and each lens unit in the zoom lens is driven in the optical axis direction by a lens cam groove portion (not illustrated) formed in the cam cylinder 32.

A flare cutting stop 41 corresponding to the flare cutting stop FS according to Examples 1 to 3 includes a plurality of stop blades 41a, a rotating member 41b that rotates around the optical axis in order to drive the plurality of stop blades 41a in an opening/closing direction, and a base member 41c that rotatably holds the plurality of stop blades 41a and the rotating member 41b. The rotating member 41b includes a plurality of blade cam groove portions (not illustrated) configured to drive the plurality of stop blades 41a in the opening/closing direction. The rotating member 41b further includes an engaging portion 41d that extends outward in a radial direction. The engaging portion 41d is engaged with a flare cutting cam groove portion (not illustrated) formed in the cam cylinder 32.

As the cam cylinder 32 rotates according to the zooming operation, the rotating member 41b rotates via the engaging portion 41d engaged with the flare cutting cam groove portion, and the plurality of stop blades 41a is driven in the opening/closing direction. Thereby, the opening diameter of the flare cutting stop 41 changes during zooming.

This example has described the case where the aperture diameter of the flare cutting stop 41 mechanically changes during zooming, but the aperture diameter of the flare cutting stop 41 may be electrically changed. More specifically, the aperture diameter of the flare cutting stop 41 may be changed by detecting the rotation of the zoom ring 31 with a sensor, and by driving an actuator, such as a motor, according to a rotation detecting signal from the sensor.

EXAMPLE 5

Figure 8:
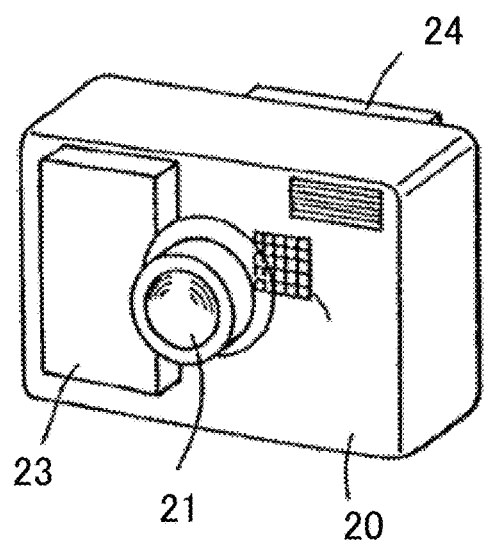
FIG. 8 is a perspective view of an imaging apparatus according to Example 5.

FIG. 8 illustrates an imaging apparatus (referred to as a camera hereinafter) 20 according to Example 5 that uses the zoom lens according to any one of Examples 1 to 3 for the imaging optical system. The camera 20 includes an imaging optical system 21 that is one of the zoom lenses according to Examples 1 to 3, and an image sensor 22 built in a camera body, such as the CCD sensor and a CMOS sensor, that captures (photoelectrically converts) an object image as an optical image formed by the imaging optical system 21.

A memory 23 records image data generated by imaging with the image sensor 22. A rear display 24 displays the image data to the user so that the user can observe it.

As described above, the camera 20 using the zoom lenses according to Examples 1 to 3 can realize a camera having the high optical performance over the entire zoom range.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-021356, filed on Feb. 8, 2019 which is hereby incorporated by reference herein in its entirety.

What is claimed is:

1. A zoom lens comprising:
a plurality of lens units, in which a distance between adjacent lens units changes during zooming;
a first aperture stop; and
a second aperture stop disposed on an image side of the first aperture stop,
wherein an aperture diameter of the first aperture stop determines an F-number of the zoom lens at a wide-angle end,
wherein the plurality of lens units includes a negative lens unit having a negative refractive power that is disposed on the image side of the first aperture stop and on an object side of the second aperture,
wherein an aperture diameter of the second aperture stop changes during the zooming, and
wherein the aperture diameter of the second aperture stop at the wide-angle end is larger than the aperture diameter of the second aperture stop at a telephoto end.

2. The zoom lens according to claim 1, wherein the following expression is satisfied:

$$1.01 \leq \varphi W/\varphi T \leq 2.00$$

where $\varphi W$ is the aperture diameter of the second aperture stop at the wide-angle end, and $\varphi T$ is the aperture diameter of the second aperture stop at the telephoto end.

3. The zoom lens according to claim 1, wherein the following expression is satisfied:

$$0.10 \leq FDw/LDw \leq 0.50$$

where FDw is a distance on an optical axis from the second aperture stop at the wide-angle end to an image plane, and LDw is an overall length of the zoom lens at the wide-angle end.

4. The zoom lens according to claim 1, wherein the following expression is satisfied:

$$0.10 \leq BFw/fw \leq 1.20$$

where BFw is a backfocus of the zoom lens at the wide-angle end, and fw is a focal length of the zoom lens at the wide-angle end.

5. The zoom lens according to claim 1, wherein the following expression is satisfied:

$$5.0 \leq LD/fw \leq 15.0$$

where LDw is an overall length of the zoom lens at the wide-angle end, and fw is a focal length of the zoom lens at the wide-angle end.

6. The zoom lens according to claim 1, wherein the following expression is satisfied:

$$0.10 \leq SFDw/LDw \leq 0.50$$

where LDw is an overall length of the zoom lens at the wide-angle end, and SFDw is a distance between the first aperture stop and the second aperture stop at the wide-angle end.

7. The zoom lens according to claim 1, wherein the following expression is satisfied:

$$0.50 \leq (SFDt+FDt)/LDt \leq 0.90$$

where SFDt is a distance between the first aperture stop and the second aperture stop at the telephoto end, FDt is a distance between the second aperture stop at the telephoto end and the image plane, and LDt is an overall length of the zoom lens at the telephoto end.

8. The zoom lens according to claim 1, wherein the negative lens unit and the second aperture stop are adjacent to each other via a gap.

9. The zoom lens according to claim 1, wherein the following expression is satisfied:

$$0.50 \leq |f\_NL|/ft \leq 3.00$$

where f_NL is a focal length of the negative lens unit.

10. The zoom lens according to claim 1, wherein during an image stabilization, the negative lens unit moves in a direction including a component orthogonal to an optical axis.

11. The zoom lens according to claim 1, further comprising a positive lens unit having a positive refractive power that is disposed adjacent to an image plane side of the second aperture stop.

12. The zoom lens according to claim 11, wherein the following expression is satisfied:

$$0.50 \leq f\_PL/ft \leq 2.50$$

where f_PL is a focal length of the positive lens unit.

13. The zoom lens according to claim 11, wherein at least one of the following expressions are satisfied:

$$1.40 \leq Nd\_PLL \leq 1.65$$

$$60 \leq vd\_PLL \leq 100$$

where Nd_PLL is a refractive index to d-line of a material of a positive lens having a positive refractive power that is included in the positive lens unit, and vd_PLL is an Abbe number of a material of the positive lens to the d-line.

14. An optical apparatus comprising a zoom lens:
wherein the zoom lens includes:
a plurality of lens units, in which a distance between adjacent lens units changes during zooming;
a first aperture stop; and
a second aperture stop disposed on an image side of the first aperture stop,
wherein an aperture diameter of the first aperture stop determines an F-number of the zoom lens at a wide-angle end,
wherein the plurality of lens units includes a negative lens unit having a negative refractive power that is disposed on the image side of the first aperture stop and on an object side of the second aperture,
wherein an aperture diameter of the second aperture stop changes during the zooming, and
wherein the aperture diameter of the second aperture stop at the wide-angle end is larger than the aperture diameter of the second aperture stop at a telephoto end.

15. An optical apparatus comprising:
a zoom lens: and
an image sensor configured to capture an optical image formed by the zoom lens,
wherein the zoom lens includes:
a plurality of lens units, in which a distance between adjacent lens units changes during zooming;
a first aperture stop; and
a second aperture stop disposed on an image side of the first aperture stop,
wherein an aperture diameter of the first aperture stop determines an F-number of the zoom lens at a wide-angle end,
wherein the plurality of lens units includes a negative lens unit having a negative refractive power that is disposed on the image side of the first aperture stop and on an object side of the second aperture,
wherein an aperture diameter of the second aperture stop changes during the zooming, and
wherein the aperture diameter of the second aperture stop at the wide-angle end is larger than the aperture diameter of the second aperture stop at a telephoto end.

* * * * *